US011894520B2

(12) United States Patent
Cho et al.

(10) Patent No.: US 11,894,520 B2
(45) Date of Patent: Feb. 6, 2024

(54) NON-AQUEOUS ELECTROLYTE INCLUDING ADDITIVE FOR NON-AQUEOUS ELECTROLYTE, AND LITHIUM SECONDARY BATTERY INCLUDING THE NON-AQUEOUS ELECTROLYTE

(71) Applicant: LG Energy Solution, Ltd., Seoul (KR)

(72) Inventors: Yoon Gyo Cho, Daejeon (KR); Jeong Woo Oh, Daejeon (KR); Chul Haeng Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 18/153,608

(22) Filed: Jan. 12, 2023

(65) Prior Publication Data
US 2023/0223598 A1 Jul. 13, 2023

(30) Foreign Application Priority Data
Jan. 13, 2022 (KR) .................. 10-2022-0005271

(51) Int. Cl.
*H01M 10/0567* (2010.01)
*H01M 10/0569* (2010.01)
*H01M 10/0568* (2010.01)

(52) U.S. Cl.
CPC ... *H01M 10/0567* (2013.01); *H01M 10/0568* (2013.01); *H01M 10/0569* (2013.01); *H01M 2300/0034* (2013.01)

(58) Field of Classification Search
CPC ......... H01M 10/0567; H01M 10/0568; H01M 10/0569; H01M 2300/0034; H01M 4/525; H01M 2300/0025; H01M 10/052; H01M 10/0525; H01M 10/4235; Y02E 60/10
See application file for complete search history.

(56) References Cited

U.S. PATENT DOCUMENTS

| | | | |
|---|---|---|---|
| 2005/0233221 A1 | 10/2005 | Araki et al. | |
| 2008/0138703 A1* | 6/2008 | Deguchi | H01M 10/0525 429/188 |
| 2009/0291369 A1 | 11/2009 | Araki et al. | |
| 2017/0092915 A1 | 3/2017 | Ku et al. | |
| 2020/0044287 A1 | 2/2020 | Kim et al. | |
| 2020/0185771 A1 | 6/2020 | Lee et al. | |
| 2020/0251777 A1* | 8/2020 | Lim | C07D 233/58 |
| 2021/0257660 A1 | 8/2021 | Ahn et al. | |
| 2021/0380778 A1 | 12/2021 | Park et al. | |
| 2022/0140348 A1* | 5/2022 | He | H01M 4/405 429/212 |
| 2022/0223911 A1 | 7/2022 | Kim et al. | |

FOREIGN PATENT DOCUMENTS

| | | |
|---|---|---|
| CN | 111801834 A | 10/2020 |
| JP | 2004349240 A | 12/2004 |
| KR | 20140035793 A | 3/2014 |
| KR | 20170037453 A | 4/2017 |
| KR | 101884568 B1 | 8/2018 |
| KR | 20190008100 A | 1/2019 |
| KR | 20200029372 A | 3/2020 |
| KR | 20200091227 A | 7/2020 |
| KR | 20210023756 A | 3/2021 |
| KR | 102306548 B1 | 9/2021 |
| KR | 102322612 B1 | 11/2021 |
| WO | 2021034141 A1 | 2/2021 |

* cited by examiner

*Primary Examiner* — Helen Oi K Conley
(74) *Attorney, Agent, or Firm* — Lerner David LLP

(57) ABSTRACT

The present disclosure provides a non-aqueous electrolyte including a lithium salt, an organic solvent, a compound represented by Formula 1 as a first additive, and a polymer including a repeating unit represented by Formula 2-1, Formula 2-2, and Formula 2-3 as a second additive:

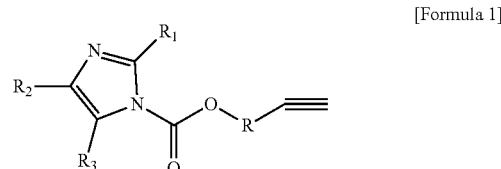

[Formula 1]

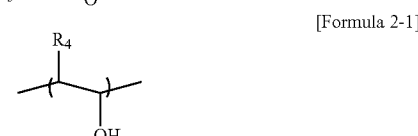

[Formula 2-1]

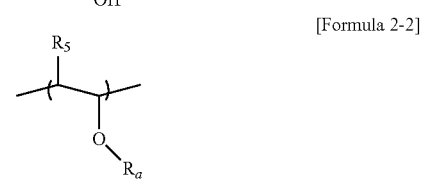

[Formula 2-2]

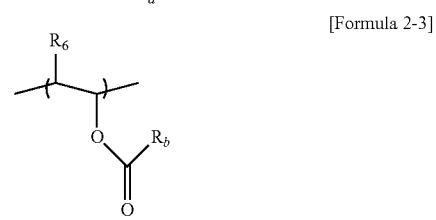

[Formula 2-3]

all the variables are described herein.

15 Claims, No Drawings

NON-AQUEOUS ELECTROLYTE INCLUDING ADDITIVE FOR NON-AQUEOUS ELECTROLYTE, AND LITHIUM SECONDARY BATTERY INCLUDING THE NON-AQUEOUS ELECTROLYTE

CROSS-REFERENCE TO RELATED APPLICATIONS

This application claims the priority from Korean Patent Application No. 10-2022-0005271 filed on Jan. 13, 2022, the disclosure of which is incorporated herein by reference.

BACKGROUND OF THE INVENTION

The present disclosure relates to a non-aqueous electrolyte including an additive for a non-aqueous electrolyte, and a lithium secondary battery including the non-aqueous electrolyte.

Recently, as application fields of a lithium secondary battery have rapidly expanded to not only the power supply of electronic devices such as electricity, electronics, communications, and computers but also the power storage supply of large-area devices such as automobiles and power storage devices, a demand for a secondary battery having high capacity, high output, and high stability has been increasing.

In particular, in a lithium secondary battery for automobiles, high capacity, high output, and long-term service life characteristics have been becoming important. In order to increase the capacity of the secondary battery, a high-nickel positive electrode active material having high energy density but low stability can be used, or the secondary battery can be driven with a high voltage.

However, when the secondary battery is driven under the above conditions, as charging and discharging proceeds, the surface structure of an electrode or a film formed on the surface of positive/negative electrode deteriorates due to a side reaction caused by the deterioration of an electrolyte, and thus transition metal ions may be eluted from the surface of the positive electrode. As described above, since the eluted transition metal ions are electro-deposited on the negative electrode, and reduce passivation ability of a solid electrolyte interphase (SEI), there occurs a problem in that the negative electrode is deteriorated.

This deterioration phenomenon of the secondary battery tends to be further accelerated when the potential of the positive electrode is increased or when the battery is exposed to high temperatures, and there occurs a problem in that the cycle characteristics of the secondary battery are degraded due to the deterioration phenomenon.

In addition, when the lithium ion battery is continuously used for a long period of time or left to stand at high temperatures, gas is generated, thereby causing a so-called swelling phenomenon in which the thickness of the battery increases, and it is known that the amount of gas generated in this case depends on the state of the SEI.

Therefore, in order to solve such problems, research and development on methods capable of suppressing the elution of metal ions from the positive electrode and forming a stable SEI film on the negative electrode, thereby reducing the swelling phenomenon of the secondary battery and increasing the stability at high temperatures have been attempted.

BRIEF SUMMARY OF THE INVENTION

An aspect of the present disclosure provides an additive for a non-aqueous electrolyte capable of suppressing the degradation of a positive electrode, reducing side reactions between a positive electrode and an electrolyte, and forming a stable SEI film on a negative electrode.

Another aspect of present disclosure provides a non-aqueous electrolyte having improved stability at high temperatures by including the additive for a non-aqueous electrolyte.

Another aspect of the present disclosure provides a lithium secondary battery having improved overall performance by including the non-aqueous electrolyte, thereby having improved high-temperature cycle characteristics and high-temperature storage characteristics.

According to an aspect of the present disclosure, there is provided a non-aqueous electrolyte including a lithium salt, an organic solvent, a compound represented by Formula 1 below as a first additive, and a polymer including a repeating unit represented by Formula 2-1, Formula 2-2, and Formula 2-3 as a second additive.

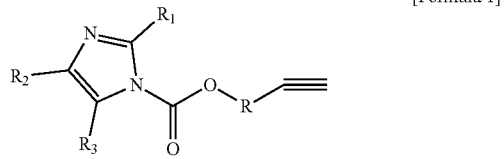

[Formula 1]

In Formula 1 above, R is a substituted or unsubstituted alkylene group having 1 to 3 carbon atoms, and $R_1$ to $R_3$ are each independently H, an alkyl group having 1 to 3 carbon atoms, or a nitrile group.

[Formula 2-1]

In Formula 2-1 above, $R_4$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group.

[Formula 2-2]

In Formula 2-2 above, $R_a$ is an alkyl group having 1 to 10 carbon atoms which is substituted with at least one nitrile group, and $R_5$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group.

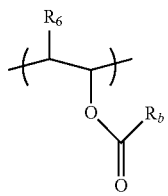

[Formula 2-3]

In Formula 2-3 above, $R_b$ is a perfluoroalkyl group having 1 to 10 carbon atoms, and $R_6$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group.

According to another aspect of the present disclosure, there is provided a lithium secondary battery including the non-aqueous electrolyte.

The first additive according to the present disclosure is a compound containing both a propargyl group, which is known to have metal ion adsorbability, and an imidazole group which is effective for forming a solid electrolyte interface (SEI) film, is capable of forming a stable ion conductive film on the surface of a negative electrode, and thus gas generation caused by a side reaction between a positive electrode and an electrolyte is suppressed, so that the swelling of a cell may be significantly reduced.

The second additive according to the present disclosure is capable of forming an elastic and robust SEI film on the surface of a negative electrode. Therefore, it is possible to prevent the negative electrode from deteriorating by maintaining the robust SEI layer even at high temperatures, and suppress an additional SEI formation reaction by solvent decomposition during cycles.

Moreover, when the first additive forms a polymeric SEI film, the second additive acts together to impart elasticity to the SEI film, thereby reinforcing the strength of the SEI film. Accordingly, since the film is not destroyed in spite of an extreme change in volume of the negative electrode during charge and discharge, the negative electrode and the electrolyte do not form a new interface. Thus, an additional electrolyte solution decomposition reaction may be suppressed during charge and discharge, and thus there is an effect of reducing the expansion of a cell due to gas generation.

That is, when the non-aqueous electrolyte of the present disclosure including the polymer provided as the additive for a non-aqueous electrolyte of the present disclosure is used, it is possible to form an electrode-electrolyte interface which is stable and has high durability even at high temperatures, and thus high-temperature cycle characteristics and high-temperature storage characteristics are improved, so that a lithium secondary battery with improved overall performance may be achieved.

DETAILED DESCRIPTION OF THE INVENTION

It will be understood that terms or words used in the present specification and claims shall not be construed as being limited to having meanings defined in commonly used dictionaries, but should be interpreted as having meanings and concepts consistent with the technical idea of the present disclosure based on the principle that an inventor may appropriately define concepts of the terms to best explain the disclosure.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Also, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, —$CH_2$—, —$CH_2CH_2$—, —$CH_2CH_2CH_2$—, —$CH_2CH(CH_3)$—, —$CH(CH_3)CH_2$—, —$CH(CH_3)CH_2CH_2$—, and the like.

Furthermore, in the present specification, the expression "alkylene group" denotes a branched or unbranched divalent saturated hydrocarbon group.

In addition, in the present specification, an alkyl group, an alkenyl group, an alkynyl group, an alkoxy group, a cycloalkyl group, a cycloalkenyl group and an aryl group may be substituted or unsubstituted. Unless otherwise defined, the term "substituted" means that at least one hydrogen bonded to carbon is substituted with an element other than hydrogen, and for example, it means being substituted with an alkyl group having 1 to 20 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, a heterocycloalkyl group having 3 to 12 carbon atoms, a heterocycloalkenyl group having 3 to 12 carbon atoms, an aryloxy group having 6 to 12 carbon atoms, a halogen atom, a fluoroalkyl group having 1 to 20 carbon atoms, a nitro group, an aryl group having 6 to 20 carbon atoms, a heteroaryl group having 2 to 20 carbon atoms, a haloaryl group having 6 to 20 carbon atoms, etc.

Hereinafter, the present disclosure will be described in more detail.

Non-Aqueous Electrolyte

The non-aqueous electrolyte according to the present disclosure may include a second additive in conjunction with a first additive represented by Formula 1 below.

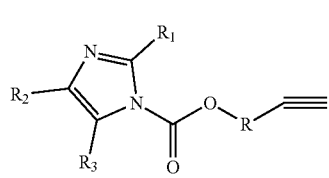

[Formula 1]

Since the first additive compound represented by Formula 1 includes a propargyl group having a triple bond known to have metal ion adsorbability and an oxygen atom, the propargyl group, which is separated by cleavage of a nitrogen (N) atom and a carbon (C) atom of an imidazole group, may adsorb on the metallic foreign matter, such as Fe, Co, Mn, or Ni, dissolved from the positive electrode during high-voltage charge, and thus, a negative electrode degradation phenomenon, which occurs by the electrodeposition of the metallic foreign matter on the surface of the negative electrode, may be effectively suppressed. Also, the compound represented by Formula 1 may form a stable ion conductive film on the surface of the negative electrode because the lone pair of the nitrogen (N) atom of the imidazole group is reduced on the surface of the negative electrode by being reacted with alkyl carbonate as a decomposition product of ethylene carbonate (EC) used as the organic solvent. Thus, an additional electrolyte solution decomposition reaction may not only be suppressed during charge and discharge, but cycle life characteristics and high-temperature storage performance may also be improved by facilitating the intercalation and deintercalation of lithium ions into and from the negative electrode even during overcharge or high-temperature storage.

The second additive may include a repeating unit of Formula 2-1, Formula 2-2, and Formula 2-3 below:

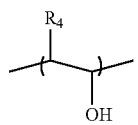

[Formula 2-1]

The repeating unit of Formula 2-1 included in the second additive includes a hydroxyl group to give a hydrogen bond to the additive structure, and the hydrogen bond has an effect of helping to withstand the physical deterioration of the battery material.

In Formula 2-1 above, $R_4$ may be any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group. Preferably, $R_4$ may be H or an alkyl group having 1 to 10 carbon atoms, and most preferably, may be H.

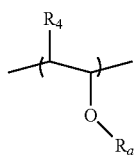

[Formula 2-2]

The repeating unit of Formula 2-2 included in the second additive contains a nitrile group, and thus may be well electro-deposited on the negative electrode, so that a SEI layer may be easily formed. Therefore, it is possible to rapidly form a robust SEI layer.

In Formula 2-2 above, $R_a$ may be an alkyl group having 1 to 10 carbon atoms which is substituted with at least one nitrile group, preferably, $R_a$ in Formula 2-2 above may be a linear or branched alkyl group having 1 to 5 carbon atoms which is substituted with at least one nitrile group, and most preferably, $R_a$ in Formula 2-2 above may be an alkyl group having 1 to 3 carbon atoms which is substituted with at least one nitrile group. For example, $R_a$ may be $CH_2CN$ or $CH_2CH_2CN$.

In Formula 2-2 above, $R_5$ may be any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group. Preferably, $R_5$ may be H or an alkyl group having 1 to 10 carbon atoms, and most preferably, may be H.

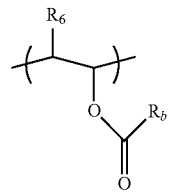

[Formula 2-3]

The repeating unit of Formula 2-3 contained in the second additive includes a fluoroalkyl group, thereby a LiF inorganic material is easily produced, and thus it is possible to form a SEI layer based on a stable polymer-inorganic material. Therefore, it is possible to suppress the degradation in passivation ability of SEI at high temperatures, thereby preventing the negative electrode from deteriorating.

In Formula 2-3 above, $R_b$ may be a fluoroalkyl group having 1 to 10 carbon atoms. In terms of forming a robust inorganic material SEI layer based on LiF on the positive electrode and negative electrode, preferably $R_b$ may be a perfluoroalkyl group having 1 to 10 carbon atoms, and most preferably, may be a perfluoroalkyl group having 1 to 5 carbon atoms.

In Formula 2-3 above, $R_6$ may be any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group. Preferably, $R_6$ may be H or an alkyl group having 1 to 10 carbon atoms, and most preferably, may be H.

The non-aqueous electrolyte according to the present disclosure may include a polymer represented by Formula 2 below as an additive.

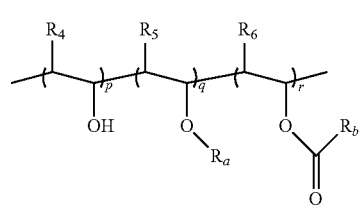

[Formula 2]

In Formula 2 above, $R_a$ may be an alkyl group having 1 to 10 carbon atoms which is substituted with at least one nitrile group, preferably, $R_a$ in Formula 2 above may be a linear or branched alkyl group having 1 to 5 carbon atoms which is substituted with at least one nitrile group, and most preferably, $R_a$ in Formula 2 above may be an alkyl group having 1 to 3 carbon atoms which is substituted with at least one nitrile group. For example, $R_a$ may be $CH_2CN$ or $CH_2CH_2CN$.

In Formula 2 above, $R_b$ may be a fluoroalkyl group having 1 to 10 carbon atoms. In terms of forming a robust inorganic material SEI layer based on LiF on the positive electrode and negative electrode, preferably $R_b$ may be a perfluoroalkyl group having 1 to 10 carbon atoms, and most preferably, may be a perfluoroalkyl group having 1 to 10 carbon atoms.

In Formula 2 above, $R_4$ to $R_6$ may be each independently any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group. Preferably, $R_4$ to $R_6$ may be each independently H or an alkyl group having 1 to 10 carbon atoms, and most preferably, may be H.

In Formula 2 above, p, q and r may be each independently an integer of 1 to 100. Preferably, p may be an integer of 1 to 99, q may be an integer of 1 to 99, and r may be an integer of 1 to 99, and most preferably, p may be an integer of 1 to 80, q may be an integer of 1 to 80, and r may be an integer of 1 to 80. In Formula 2 above, when p, q, and r satisfy the above range, there are effects in that sufficient nitrile groups which may participate in the reaction of forming a negative electrode SEI layer when a battery is charged are present, and perfluoro groups, which may provide sufficient LiF which may participate in the reaction of forming a negative electrode SEI layer, are present. In addition, there is an advantage that sufficient hydrogen bonds, which allow to withstand the physical deterioration of the battery material, are given.

The first additive in the non-aqueous electrolyte according to the present disclosure may be included in an amount of 0.01 parts by weight to 2 parts by weight, preferably 0.05 parts by weight to 2 parts by weight, and more preferably, 0.10 parts by weight to 1.5 parts by weight based on 100 parts by weight of the non-aqueous electrolyte. When the content of the first additive satisfies the above range, the film-forming effect on the surface of the negative electrode is sufficient, and thus there is an effect of achieving excellent high-temperature service life characteristics and high-temperature storage characteristics.

The second additive in the non-aqueous electrolyte according to the present disclosure may be included in an amount of 0.01 parts by weight to 10 parts by weight, preferably 0.05 parts by weight to 5 parts by weight, and more preferably, 0.10 parts by weight to 3 parts by weight based on 100 parts by weight of the non-aqueous electrolyte. When the content of the first additive satisfies the above range, the film-forming effect on the surface of the negative electrode is sufficient, and thus there is an effect of achieving excellent high-temperature service life characteristics and high-temperature storage characteristics.

In the non-aqueous electrolyte of the present disclosure, the first additive and the second additive may be included in a weight ratio of 1:0.01 to 1:40, preferably, in a weight ratio of 1:1.5 to 1:10, and most preferably, in a weight ratio of 1:1.5 to 1:5. The elasticity of the formed SEI film is within an appropriate range, and thus the SEI film may be maintained firmly during charge and discharge or at high temperatures.

The non-aqueous electrolyte according to the present disclosure may include a lithium salt. The lithium salt is used as an electrolyte salt in the lithium secondary battery, wherein it is used as a medium for transferring ions. Typically, for example, the lithium salt may include $Li^+$ as a cation, and may include at least one selected from the group consisting of $F^-$, $Cl^-$, $Br^-$, $I^-$, $NO_3^-$, $N(ON)_2^-$, $BF_4^-$, $ClO_4^-$, $B_{10}Cl_{10}^-$, $AlCl_4^-$, $AlO_2^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$ (lithium bis(fluorosulfonyl)imide, LiFSI), $LiN(SO_2CF_2CF_3)_2$ (lithium bis(perfluoroethanesulfonyl)imide, LiBETI), and $LiN(SO_2CF_3)_2$ (lithium bis(trifluoromethanesulfonyl)imide, LiTFSI) or a mixture of two or more thereof. In addition to the above, any lithium salt commonly used in an electrolyte of a lithium secondary battery may be used without limitation.

The lithium salt may be appropriately changed in a normally usable range, but may be included in a concentration of 0.5 M to 4.0 M, preferably, 1.0 M to 3.0 M, and more preferably, 1.5 M to 2.0 M in the electrolyte in order to obtain an optimum effect of forming a film for preventing corrosion on the surface of an electrode. When the concentration of the lithium salt satisfies the above range, there is a sufficient effect of improving cycle characteristics during high-temperature storage of a lithium secondary battery, and the viscosity of the non-aqueous electrolyte is suitable, so that the impregnability of the electrolyte may be improved.

The non-aqueous electrolyte according to the present disclosure may include an organic solvent. The non-aqueous organic solvent may include at least one organic solvent selected from the group consisting of a cyclic carbonate-based organic solvent, a linear carbonate-based organic solvent, a linear ester-based organic solvent, and a cyclic ester-based organic solvent.

The additive according to the present disclosure is effective particularly in the case of using the cyclic carbonate solvent. When a conventional electrolyte additive is used in conjunction with the cyclic carbonate solvent, the SEI film formed by the decomposition of the cyclic carbonate solvent has had a problem in that it is difficult to maintain the SEI film due to a change in volume of the negative electrode, which occurs during cycles, and thus the solvent is continually decomposed. Thus, there has been a problem in that the ionic conductivity of the electrolyte is reduced, and thus the cycle characteristics are deteriorated. However, when the polymer according to the present disclosure is used as an additive in conjunction with the cyclic carbonate solvent, it is possible to form a robust SEI film, and thus there is an effect of maintaining cycle characteristics high.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), fluoro ethylene carbonate (FEC), 1,2-butylene carbonate, 2,3-butylene carbonate, 1,2-pentylene carbonate, 2,3-pentylene carbonate, and vinylene carbonate (VC), and, among them, the cyclic carbonate-based organic solvent may include fluoro ethylene carbonate (FEC).

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include diethyl carbonate (DEC).

Furthermore, the organic solvent may further include at least one ester-based organic solvent selected from the group consisting of a linear ester-based organic solvent and a cyclic ester-based organic solvent in addition to at least one carbonate-based organic solvent selected from the group consisting of the cyclic carbonate-based organic solvent and the linear carbonate-based organic solvent, in order to prepare an electrolyte having high ionic conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

Meanwhile, if necessary, any organic solvent commonly used in a non-aqueous electrolyte may be additionally used without limitation as the organic solvent. For example, at least one organic solvent among an ether-based organic solvent, a glyme-based organic solvent, and a nitrile-based organic solvent may be further included.

As the ether-based solvent, any one selected from the group consisting of dimethyl ether, diethyl ether, dipropyl ether, methyl ethyl ether, methyl propyl ether, ethyl propyl ether, 1,3-dioxolane (DOL), and 2,2-bis(trifluoromethyl)-1,3-dioxolane (TFDOL) or a mixture of two or more thereof may be used, but the ether-based solvent is not limited thereto.

The glyme-based organic solvent is a solvent having higher dielectric constant and lower surface tension than the linear carbonate-based organic solvent and having lower reactivity with metal, wherein the glyme organic solvent may include at least one selected from the group consisting of dimethoxyethane (glyme, DME), diglyme, triglyme, and tetraglyme (TEGDME), but the glyme organic solvent is not limited thereto.

The nitrile-based organic solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, but the nitrile organic solvent is not limited thereto.

In addition, the non-aqueous electrolyte of the present disclosure may further include, if necessary, an electrolyte additive known in the art in the non-aqueous electrolyte in order to prevent the non-aqueous electrolyte from being decomposed in a high-output environment and causing a negative electrode to collapse, or to further improve low-temperature high-rate discharge characteristics, high-temperature stability, overcharge prevention, an effect of suppressing battery expansion at high temperatures, and the like.

Representative examples of the additional electrolyte additive may include at least one additive for forming an SEI film selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinyl ethylene carbonate.

The halogen-substituted carbonate-based compound may include fluoroethylene carbonate (FEC).

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound may include ethylene sulfate (Esa), trimethylene sulfate (TMS), or methyl trimethylene sulfate (MTMS).

The phosphate-based compound may include at least one compound selected from the group consisting of lithium difluorobis(oxalato)phosphate, lithium difluorophosphate, tetramethyl trimethylsilyl phosphate, trimethylsilyl phosphite, tris(2,2,2-trifluoroethyl)phosphate, and tris(trifluoroethyl)phosphite.

The borate-based compound may include tetraphenylborate, lithium oxalyldifluoroborate (LiODFB), and lithium bis(oxalato)borate (LiB($C_2O_4$)$_2$, LiBOB).

The nitrile-based compound may include at least one compound selected from the group consisting of succinonitrile, adiponitrile, acetonitrile, propionitrile, butyronitrile, valeronitrile, caprylonitrile, heptanenitrile, cyclopentanecarbonitrile, cyclohexanecarbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte, and may be lithium difluorophosphate (LiDFP), $LiPO_2F_2$, $LiBF_4$, or the like.

Among the additional electrolyte additives, when a combination of vinylene carbonate (VC), 1,3-propane sultone (PS), ethylene sulfate (Esa), and lithium difluorophosphate (LiDFP) is further included, it is possible to form a more robust SEI film on the surface of a negative electrode during an initial activation process of a secondary battery, and to suppress the generation of a gas which may be generated due to the decomposition of an electrolyte at high temperatures, thereby improving high-temperature stability of the secondary battery.

Meanwhile, the additional additives may be used as a mixture of two or more thereof, and may be included in an amount of 0.050 wt % to 20 wt %, particularly 0.10 wt % to 15 wt %, and preferably 0.30 wt % to 10 wt % based on a total weight of the non-aqueous electrolyte. When the content of the additional electrolyte additives satisfies the above range, there is a more excellent effect of improving ionic conductivity and cycle characteristics.

Lithium Secondary Battery

The present disclosure also provides a lithium secondary battery including the non-aqueous electrolyte.

Specifically, the lithium secondary battery includes a positive electrode including a positive electrode active material, a negative electrode including a negative electrode active material, a separator disposed between the positive electrode and the negative electrode, and the above-described non-aqueous electrolyte.

In this case, the lithium secondary battery of the present disclosure may be prepared according to a typical method known in the art. For example, after an electrode assembly is formed by sequentially stacking a positive electrode, a negative electrode, and a separator disposed between the positive electrode and the negative electrode, the lithium secondary battery of the present disclosure may be prepared by inserting the electrode assembly into a battery case, and injecting the non-aqueous electrolyte according to the present disclosure.

(1) Positive Electrode

The positive electrode may be prepared by coating a positive electrode collector with a positive electrode material mixture slurry including a positive electrode active material, a binder, a conductive agent, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium metal oxide may include a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-z}Ni_zO_4$ (where $0<Z<2$), etc.), a lithium-nickel-cobalt-based oxide (e.g., $LiNi_{1-Y1}Co_{Y1}O_2$ (where $0<Y1<1$), etc.), a lithium-manganese-cobalt-based oxide (e.g., $LiCo_{1-Y2}Mn_{Y2}O_2$ (where $0<Y2<1$), $LiMn_{2-z1}Co_{z1}O_4$ (where $0<Z1<2$), etc.), a lithium-nickel-manganese-cobalt-based oxide (e.g., $Li(Ni_pCo_qMn_r)O_2$ (where $0<p<1$, $0<q<1$, $0<r<1$, and $p+q+r=1$) or $Li(Ni_{p1}Co_{q1}Mn_{r1})O_4$ (where $0<p1<2$, $0<q1<2$, $0<r1<2$, and $p1+q1+r1=2$), etc.), or a lithium-nickel-cobalt-transition metal (M) oxide (e.g., $Li(Ni_{p2}Co_{q2}Mn_{r2}M_{s2})O_2$ (where M is selected from the group consisting of Al, Fe, V, Cr, Ti, Ta, Mg, and Mo, and p2, q2, r2, and s2 are atomic fractions of each independent elements, wherein $0<p2<1$, $0<q2<1$, $0<r2<1$, $0<S2<1$, and $p2+q2+r2+S2=1$), etc.), and any one thereof or a compound of two or more thereof may be included.

Among these materials, in terms of the improvement of capacity characteristics and stability of the battery, the lithium metal oxide may include $LiCoO_2$, $LiMnO_2$, $LiNiO_2$, a lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, etc.), a lithium nickel cobalt aluminum oxide (e.g., $Li(Ni_{0.8}Co_{0.15}Al_{0.05})O_2$, etc.), or the like, and any one thereof or a mixture of two or more thereof may be used.

The positive electrode active material may be included in an amount of 60 wt % to 99 wt %, preferably 70 wt % to 99 wt %, and more preferably 80 wt % to 98 wt % based on a total weight of solids excluding the solvent in the positive electrode material mixture slurry.

The binder is a component that assists in the binding between the active material and the conductive agent and in the binding with the current collector.

Examples of the binder may include polyvinylidene fluoride, polyvinyl alcohol, starch, hydroxypropylcellulose, regenerated cellulose, polyvinylpyrrolidone, polytetrafluoroethylene, polyethylene (PE), polypropylene, an ethylene-propylene-diene monomer, a sulfonated ethylene-propylene-diene monomer, a styrene-butadiene rubber, a fluoro rubber, various copolymers, and the like.

The binder may be commonly included in an amount of 1 wt % to 20 wt %, preferably 1 wt % to 15 wt %, and more preferably 1 wt % to 10 wt % based on the total weight of solid in excluding the solvent in the positive electrode material mixture slurry.

The conductive agent is a component for further improving the conductivity of the positive electrode active material, and may be added in an amount of 1 wt % to 20 wt % based on the total weight of the solid content in the positive electrode material mixture slurry. The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, and thermal black; graphite powder such as natural graphite with a well-developed crystal structure, artificial graphite, and graphite; conductive fibers such as carbon fibers and metal fibers; conductive powder such as fluorocarbon powder, aluminum powder, and nickel powder; conductive whiskers such as zinc oxide whiskers and potassium titanate whiskers; conductive metal oxide such as titanium oxide; and polyphenylene derivatives, may be used.

The conductive agent may be commonly included in an amount of 1 wt % to 20 wt %, preferably 1 wt % to 15 wt %, and more preferably 1 wt % to 10 wt % based on the total weight of solids excluding the solvent in the positive electrode material mixture slurry.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of a solid content including the positive electrode active material as well as selectively the binder and the conductive agent is in a range of 50 wt % to 95 wt %, preferably 70 wt % to 95 wt %, and more preferably 70 wt % to 90 wt %.

(2) Negative Electrode

The negative electrode, for example, may be prepared by coating a negative electrode collector with a negative electrode material mixture slurry including a negative electrode active material, a binder, a conductive agent, and a solvent, or a graphite electrode formed of carbon (C) or a metal itself may be used as the negative electrode.

For example, in a case in which the negative electrode is prepared by coating the negative electrode collector with the negative electrode material mixture slurry, the negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of Cu, Ni, Na, K, Rb, Cs, Fr, Be, Mg, Ca, Sr, Si, Sb, Pb, In, Zn, Ba, Ra, Ge, Al, and Sn, or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me:Mn, Fe, Pb, Ge; Me':Al, B, P, Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include lithium-containing titanium composite oxide (LTO), vanadium oxide, and lithium vanadium oxide.

The additive according to the present disclosure is effective particularly when Si or $SiO_x$ ($0 < x \leq 2$) is used as a negative electrode active material. Specifically, when a Si-based negative electrode active material is used, the degradation of service life characteristics is promoted by extreme expansion/contraction of volume during cycles if a robust SEI layer is not formed on the surface of a negative electrode during an initial activation process. However, the additive according to the present disclosure is capable of forming an elastic and robust SEI layer, thereby making the secondary battery using the Si-based negative electrode active material have excellent service life and storage characteristics.

The negative electrode active material may be included in an amount of 60 wt % to 99 wt %, preferably 70 wt % to 99 wt %, and more preferably 80 wt % to 98 wt % based on a total weight of the solid content in the negative electrode material mixture slurry.

Examples of the binder may include polyvinylidene fluoride (PVDF), polyvinyl alcohol, starch, hydroxypropylcellulose, regenerated cellulose, polyvinylpyrrolidone, polytetrafluoroethylene, polyethylene, polypropylene, an ethylene-propylene-diene monomer, a sulfonated ethylene-propylene-diene monomer, a styrene-butadiene rubber, a fluoro rubber, and various copolymers thereof. Specifically, styrene butadien rubber (SBR)-carboxylmethyl cellulose (CMC) may be used in terms of high thickening properties.

The binder may be commonly included in an amount of 1 wt % to 20 wt %, preferably 1 wt % to 15 wt %, and more preferably 1 wt % to 10 wt % based on the total weight of solids excluding the solvent in the negative electrode material mixture slurry.

The conductive agent is a component for further improving the conductivity of the negative electrode active material, and may be added in an amount of 1 wt % to 20 wt % based on the total weight of the solid content in the negative electrode material mixture slurry. The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, and thermal black; graphite powder such as natural graphite with a well-developed crystal structure, artificial graphite, and graphite; conductive fibers such as carbon fibers and metal fibers; conductive powder such as fluorocarbon powder, aluminum powder, and nickel powder; conductive whiskers such as zinc oxide whiskers and potassium titanate whiskers; conductive metal oxide such as titanium oxide; and polyphenylene derivatives, may be used.

The conductive agent may be included in an amount of 1 wt % to 20 wt %, preferably 1 wt % to 15 wt %, and more preferably 1 wt % to 10 wt % based on the total weight of solids excluding the solvent in the negative electrode material mixture slurry.

The solvent may include water or an organic solvent, such as N-methyl-2-pyrrolidone (NMP), and may be used in an amount such that desirable viscosity is obtained when the negative electrode active material as well as optionally the binder and the conductive agent is included. For example, the solvent may be included in an amount such that a concentration of a solid content including the negative electrode active material as well as optionally the binder and the conductive agent is in a range of 50 wt % to 95 wt %, for example, 70 wt % to 90 wt %.

In a case in which the metal itself is used as the negative electrode, the negative electrode may be prepared by a method of physically bonding, rolling, or depositing a metal on a metal thin film itself or the negative electrode collector. The depositing method may use an electrical deposition method or chemical deposition method of metal.

For example, the metal bonded/rolled/deposited on the metal thin film itself or the negative electrode collector may include one metal selected from the group consisting of lithium (Li), nickel (Ni), tin (Sn), copper (Cu), and indium (In) or an alloy of two metals thereof.

(3) Separator

Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present disclosure is not limited thereto. Furthermore, a coated separator including a ceramic component or a polymer material may be used to secure heat resistance or mechanical strength, and the separator having a single layer or multilayer structure may be optionally used.

Specifically, a safety reinforced separator (SRS) on which a coating layer including a ceramic component or a polymer material is formed may be used as separators included in the electrode assembly of the present disclosure in order to secure heat resistance or mechanical strength.

Specifically, the separators included in the electrode assembly of the present disclosure may include a porous separator substrate, and a porous coating layer entirely coated on one surface or both surfaces of the separator substrate, and the coating layer may include a mixture of inorganic particles selected from a metal oxide, a metalloid oxide, a metal fluoride, a metal hydroxide, and a combination thereof, and a binder polymer for connecting and fixing the inorganic particles to each other.

The coating layer may include, as the inorganic particles, at least one selected from $Al_2O_3$, $SiO_2$, $TiO_2$, $SnO_2$, $CeO_2$, $MgO$, $NiO$, $CaO$, $ZnO$, $ZrO_2$, $Y_2O_3$, $SrTiO_3$, $BaTiO_3$, $Mg(OH)_2$, or $MgF$. Here, the inorganic particles may improve thermal stability of the separator. That is, the inorganic particles may prevent the separator from being contracted at high temperatures. In addition, the binder polymer may improve mechanical stability of the separator by fixing the inorganic particles.

A shape of the lithium secondary battery of the present disclosure is not particularly limited, but a cylindrical type using a can, a prismatic type, a pouch type, or a coin type may be used.

Hereinafter, the present disclosure will be described in more detail with reference to specific examples. However, the following examples are merely presented to exemplify the present disclosure, and the scope of the present disclosure is not limited thereto. It will be apparent to those skilled in the art that various modifications and alterations are possible within the scope and technical spirit of the present disclosure. Such modifications and alterations fall within the scope of claims included herein.

SYNTHETIC EXAMPLES

To a 250 mL-round flask, PVA-CN (3 g, 0.01925 mol), and dimethylform amide (87.5 ml) were added and the resulting mixed solution was stirred. Perfluorobutanoic acid (3.3 g, 0.0288 mol), and dicyclohexylcarbodiimide (5.94 g, 0.0288 mol) were added to the mixed solution, and then the round flask was put into ice-water. 4-dimethylaminopyridine (0.15 g, 0.0012 mol) was dissolved in 12 mL of dimethylformamide, and then slowly added to the round flask. After 10 minutes, the ice-water was removed, and the reaction was performed at room temperature for 67 hours. After the reaction was terminated, the obtained precipitate was filtered and the remaining polymer solution was precipitated in distilled water and then the precipitate was dried in vacuum in an 80° C. vacuum oven to obtain a polymer. The obtained polymer was a material represented by Formula 2a.

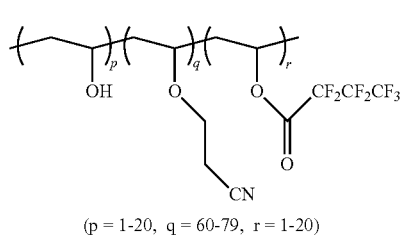

[Formula 2a]

(p = 1-20, q = 60-79, r = 1-20)

EXAMPLES

Example 1

(Preparation of Non-Aqueous Electrolyte)

A non-aqueous solvent was prepared by dissolving $LiPF_6$ to 1.5 M in an organic solvent (fluoro ethylene carbonate (FEC):diethyl carbonate (DEC)=10:90 volume ratio), and 0.1 g of a compound of Formula 1a below and 0.1 g of a polymer of Formula 2a below were introduced to 99.8 g of the non-aqueous solvent, thereby preparing a non-aqueous electrolyte.

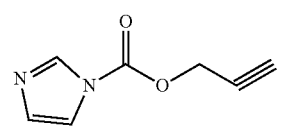

[Formula 1a]

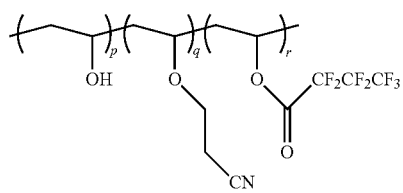

[Formula 2a]

(p = 1-20, q = 60-79, r = 1-20)

(Manufacture of Lithium Secondary Battery)

A positive electrode active material ($LiNi_{0.85}Co_{0.05}Mn_{0.08}Al_{0.02}O_2$), a conductive agent (carbon nanotube), and a binder (polyvinylidene fluoride) were added to N-methyl-2-pyrrolidone (NMP), which was a solvent, in a weight ratio of 97.74:0.7:1.56 to prepare a positive electrode slurry (solid content 75.5 wt %). The positive electrode slurry was applied on one surface of a positive electrode collector (Al thin film) having a thickness of 15 μm, dried, and roll-pressed to prepare a positive electrode.

A negative electrode active material (silicon; Si), a conductive agent (carbon black), and a binder (styrene-butadien rubber(SBR)-carboxylmethyl cellulose (CMC)) were added in a weight ratio of 70:20.3:9.7 to N-methyl-2-pyrrolidone (NMP), which was a solvent, to prepare a negative electrode slurry (solid content 26 wt %). The negative electrode slurry was applied on one surface of a negative electrode current collector (Cu thin film) having a thickness of 15 μm, dried, and roll-pressed to prepare a negative electrode.

In a dry room, a polyolefin-based porous separator on which inorganic particles Al2O3 were applied was disposed between the positive electrode and the negative electrode prepared above, and then the prepared non-aqueous electrolyte was injected thereto to manufacture a secondary battery.

Example 2

A secondary battery was manufactured in the same manner as in Example 1 except that 0.1 g of the compound of Formula 1a and 3 g of the polymer of Formula 2a were introduced to 96.9 g of the non-aqueous solvent prepared in Example 1 to prepare a non-aqueous electrolyte.

Example 3

A secondary battery was manufactured in the same manner as in Example 1 except that 1.5 g of the compound of Formula 1a and 0.1 g of the polymer of Formula 2a were introduced to 98.4 g of the non-aqueous solvent prepared in Example 1 to prepare a non-aqueous electrolyte.

Example 4

A secondary battery was manufactured in the same manner as in Example 1 except that 0.5 g of the compound of Formula 1a and 2 g of the polymer of Formula 2a were introduced to 97.5 g of the non-aqueous solvent prepared in Example 1 to prepare a non-aqueous electrolyte.

Example 5

A secondary battery was manufactured in the same manner as in Example 1 except that 1.5 g of the compound of Formula 1a and 3 g of the polymer of Formula 2a were introduced to 95.5 g of the non-aqueous solvent prepared in Example 1 to prepare a non-aqueous electrolyte.

Example 6

A non-aqueous solvent was prepared by dissolving LiPF$_6$ to 1.5 M in an organic solvent (fluoro ethylene carbonate (FEC):diethyl carbonate (DEC)=10:90 volume ratio), and 0.1 g of a compound of Formula 1a below and 0.1 g of a polymer of Formula 2b below were introduced to 99.8 g of the non-aqueous solvent, thereby preparing a non-aqueous electrolyte.

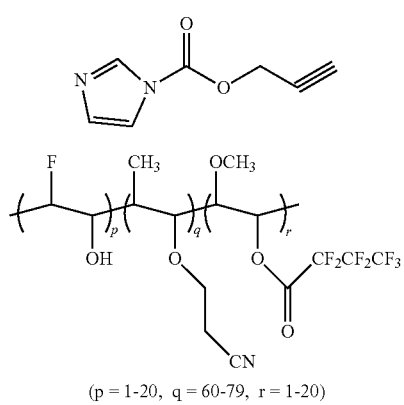

A secondary battery was manufactured in the same manner as in Example 1 except above mentioned non-aqueous electrolyte was used.

Example 7

A non-aqueous solvent was prepared by dissolving LiPF$_6$ to 1.5 M in an organic solvent (fluoro ethylene carbonate (FEC):diethyl carbonate (DEC)=10:90 volume ratio), and 0.1 g of a compound of Formula 1a below and 0.1 g of a polymer of Formula 2c below were introduced to 99.8 g of the non-aqueous solvent, thereby preparing a non-aqueous electrolyte.

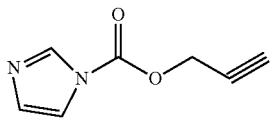

[Formula 1a]

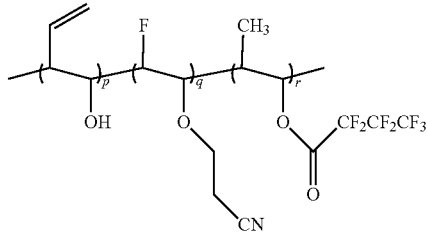

[Formula 2c]

(p = 1-20, q = 60-79, r = 1-20)

A secondary battery was manufactured in the same manner as in Example 1 except above mentioned non-aqueous electrolyte was used.

Comparative Example 1

A secondary battery was manufactured in the same manner as in Example 1 except that 100 g of the non-aqueous solvent prepared in Example 1 was used to prepare a non-aqueous electrolyte.

Comparative Example 2

A secondary battery was manufactured in the same manner as in Example 1 except that 1.5 g of the compound of Formula 1a was introduced to 98.5 g of the non-aqueous solvent prepared in Example 1 to prepare a non-aqueous electrolyte.

Comparative Example 3

A secondary battery was manufactured in the same manner as in Example 1 except that 3 g of the polymer of Formula 2a was introduced to 97 g of the non-aqueous solvent prepared in Example 1 to prepare aqueous non-aqueous electrolyte.

Experimental Example 1—Evaluation of High-Temperature Cycle Characteristics

For each of the secondary batteries manufactured in Examples 1 to 7 and Comparative Examples 1 to 3, cycle characteristics were evaluated.

Specifically, each of the batteries manufactured in Examples 1 to 7 and Comparative Examples 1 to 3 was charged to 4.2 V with a constant current of 1 C at 45° C., and then discharged to 3.0 V with a constant current of 0.5 C, which was set as one cycle, and then 250 cycles of the charge and discharge were performed, and then a capacity retention was measured based on an initial capacity after one cycle. The results are listed in Table 1 below:

TABLE 1

|  | Capacity retention (%) |
| --- | --- |
| Example 1 | 82.5 |
| Example 2 | 83.4 |
| Example 3 | 83.8 |
| Example 4 | 84.5 |
| Example 5 | 85.7 |
| Example 6 | 83.6 |
| Example 7 | 84.0 |
| Comparative Example 1 | 77.4 |
| Comparative Example 2 | 79.6 |
| Comparative Example 3 | 81.2 |

As shown in Table 1, Examples 1 to 7, in which a combination of the first additive and the second additive was used, had higher capacity retention than those of Comparative Example 1, in which no additives were used, Comparative Example 2, in which only the first additive was used, and Comparative Example 3, in which only the second additive was used, and thus had excellent service life characteristics.

Experimental Example 2—Evaluation of High-Temperature Storage Characteristics

For each of the secondary batteries manufactured in Examples 1 to 7 and Comparative Examples 1 to 3, high-temperature storage characteristics were evaluated.

Specifically, the secondary batteries of Examples 1 to 7 and Comparative Examples 1 to 3 were each fully charged to 4.2 V, and then stored at 60° C. for 8 weeks.

Before the storage, the capacity of each of the fully-charged secondary batteries was measured and then set as an initial capacity of the secondary battery.

After 8 weeks, the capacity of each of the stored batteries was measured to calculate a capacity reduced during the 8-week storage period. The percentage of the reduced capacity to the initial capacity of the secondary battery was calculated to derive a capacity retention after one week. The results are listed in Table 2 below:

TABLE 2

|  | Capacity retention (%) |
| --- | --- |
| Example 1 | 91.6 |
| Example 2 | 92.7 |
| Example 3 | 93.5 |
| Example 4 | 95.8 |
| Example 5 | 96.5 |
| Example 6 | 92.1 |
| Example 7 | 92.9 |
| Comparative Example 1 | 45.4 |
| Comparative Example 2 | 88.6 |
| Comparative Example 3 | 90.3 |

As shown in Table 2, Examples 1 to 7, in which a combination of the first additive and the second additive was used, had higher capacity retention after 8 weeks than those of Comparative Example 1, in which no additives were used, Comparative Example 2, in which only the first additive was used, and Comparative Example 3, in which only the second additive was used, and thus had stable performance at high temperatures.

What is claimed is:
1. A non-aqueous electrolyte comprising:
a lithium salt;
an organic solvent;
a first additive; and
a second additive,
wherein the first additive is a compound represented by Formula 1; and
the second additive is a polymer comprising a repeating unit represented by Formula 2-1, Formula 2-2, and Formula 2-3:

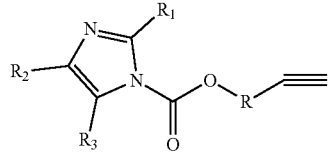

[Formula 1]

wherein, in Formula 1,
R is a substituted or unsubstituted alkylene group having 1 to 3 carbon atoms, and
$R_1$ to $R_3$ are each independently H, an alkyl group having 1 to 3 carbon atoms, or a nitrile group,

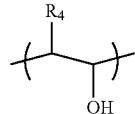

[Formula 2-1]

wherein, in Formula 2-1 above,
$R_4$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group,

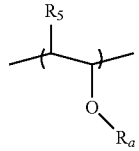

[Formula 2-2]

wherein, in Formula 2-2 above,
$R_4$ is an alkyl group having 1 to 10 carbon atoms which is substituted with at least one nitrile group, and
$R_5$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group, and

[Formula 2-3]

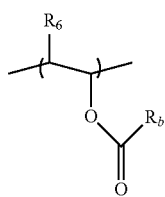

[Formula 2a]

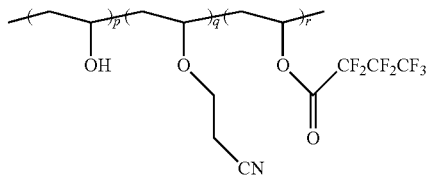

wherein p = 1-20, q = 60-79, and r = 1-20.

wherein, in Formula 2-3 above,
$R_b$ is an fluoroalkyl group having 1 to 10 carbon atoms, and
$R_6$ is any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group.

2. The non-aqueous electrolyte of claim 1, wherein the second additive is a polymer of Formula 2:

[Formula 2]

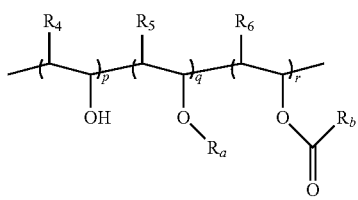

wherein, in Formula 2,
$R_4$ to $R_6$ are each independently any one selected from the group consisting of H, an alkyl group having 1 to 10 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, an aryl group having 6 to 12 carbon atoms, a halogen atom, and a nitrile group,
$R_a$ is an alkyl group having 1 to 10 carbon atoms which is substituted with at least one nitrile group,
$R_b$ is an fluoroalkyl group having 1 to 10 carbon atoms, and
p, q and r are each independently an integer of 1 to 100.

3. The non-aqueous electrolyte of claim 1, wherein, in Formula 2-2, $R_a$ is $CH_2CN$ or $CH_2CH_2CN$.

4. The non-aqueous electrolyte of claim 1, wherein, in Formula 2-3, $R_b$ is a perfluoroalkyl group having 1 to 5 carbon atoms.

5. The non-aqueous electrolyte of claim 1, wherein the first additive is a compound represented by Formula 1a, and the second additive is a polymer represented by Formula 1b:

[Formula 1a]

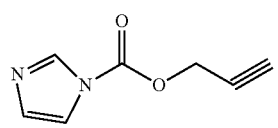

6. The non-aqueous electrolyte of claim 1, wherein the first additive is contained in an amount of 0.01 parts by weight to 2 parts by weight based on 100 parts by weight of the non-aqueous electrolyte.

7. The non-aqueous electrolyte of claim 1, wherein the second additive is contained in an amount of 0.01 parts by weight to 10 parts by weight based on 100 parts by weight of the non-aqueous electrolyte.

8. The non-aqueous electrolyte of claim 1, wherein the first additive and the second additive are contained in a weight ratio of 1:0.01 to 1:40.

9. The non-aqueous electrolyte of claim 1, wherein the lithium salt is at least one selected from the group consisting of LiCl, LiBr, LiI, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$, $LiN(SO_2CF_2CF_3)_2$, and $LiN(SO_2CF_3)_2$.

10. The non-aqueous electrolyte of claim 1, wherein the lithium salt is contained in a concentration of 0.5 M to 5.0 M.

11. The non-aqueous electrolyte of claim 1, wherein the organic solvent comprises at least one organic solvent selected from the group consisting of a cyclic carbonate-based organic solvent, a linear carbonate-based organic solvent, a linear ester-based organic solvent, and a cyclic ester-based organic solvent.

12. The non-aqueous electrolyte of claim 1, wherein the organic solvent comprises a cyclic carbonate-based organic solvent.

13. The non-aqueous electrolyte of claim 11, wherein the cyclic carbonate-based organic solvent is fluoro ethylene carbonate (FEC).

14. A lithium secondary battery comprising:
a positive electrode;
a negative electrode; and
a non-aqueous electrolyte of claim 1.

15. The lithium secondary battery of claim 13, wherein the first additive is a compound represented by Formula 1a, and the second additive is a polymer represented by Formula 1b:

[Formula 1a]

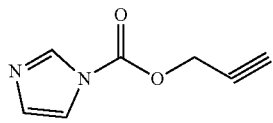

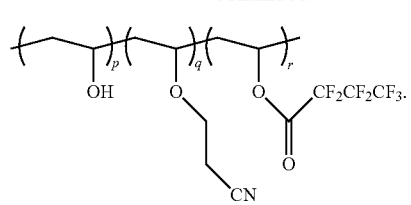
wherein p = 1-20, q = 60-79, and r = 1-20
* * * * *